(12) United States Patent
Holland

(10) Patent No.: US 6,396,575 B1
(45) Date of Patent: May 28, 2002

(54) TEST AND MEASUREMENT SYSTEM FOR DETECTING AND MONITORING FAULTS AND LOSSES IN PASSIVE OPTICAL NETWORKS (PONS)

(75) Inventor: William R. Holland, Warrington, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/584,588

(22) Filed: May 31, 2000

(51) Int. Cl.[7] ............................................... G01N 21/00
(52) U.S. Cl. ...................................................... 356/73.1
(58) Field of Search ................................ 356/73.1, 364, 356/365; 359/124, 187, 174, 173, 161; 372/23, 29, 33; 385/15, 27

(56) References Cited

U.S. PATENT DOCUMENTS

| | | |
|---|---|---|
| 5,227,623 A | 7/1993 | Heffner |
| 5,298,972 A | 3/1994 | Heffner |
| 5,371,597 A | 12/1994 | Favin et al. |
| 5,440,416 A | 8/1995 | Cohen et al. |
| 5,452,071 A | 9/1995 | Takeuchi |
| 5,534,994 A | 7/1996 | Hanson et al. |
| 5,767,956 A | 6/1998 | Yoshida |
| 5,777,727 A | 7/1998 | Sato et al. |
| 5,943,124 A | 8/1999 | Haigh |
| RE36,471 E | 12/1999 | Cohen |

Primary Examiner—Frank G. Font
Assistant Examiner—Tu T. Nguyen
(74) Attorney, Agent, or Firm—Law Offices of John de la Rosa

(57) ABSTRACT

The present invention employs "polarization markers" deployed immediately after the branching portion of a passive optical network (PON) for measuring and monitoring transmission losses and faults. Each polarization marker is configured to produce a unique polarization dependent loss (PDL) within the corresponding branch of the PON. Since each polarization marker uniquely attenuates optical test pulse(s) launched into the PON, the back-scattering uniquely varies with the launched state of polarization. Losses within each branch of the PON are then monitored by measuring the back-scattered portion of the launched optical pulse(s) as a function of time for different known states of polarization, wherein the unique PDL associated with each polarization marker is used as the basis for distinguishing the branches from one another.

34 Claims, 6 Drawing Sheets

TEST AND MEASUREMENT SYSTEM FOR DETECTING AND MONITORING FAULTS AND LOSSES IN PASSIVE OPTICAL NETWORKS (PONS)

TECHNICAL FIELD

The present invention relates to passive optical networks (PONs) and, more particularly, to a test and measurement system for detecting and monitoring losses and faults in such communication networks.

BACKGROUND OF THE INVENTION

In a passive optical network (PON), optical fibers are employed in a tree or branching arrangement to distribute optical signals to a plurality of optical network units (ONUs). For example, optical signals from a central office may be transmitted, through one or more N×N couplers, to as many as 64 ONUs. Typically, an optical time-domain reflectometer (OTDR) is used to locate faults, or to measure transmission loss in an optical fiber by launching a light pulse into the optical fiber, and then by monitoring the back-scattered signal for changes in intensity. Conventional optical time domain reflectometry, however, is generally ill-suited for passive optical networks because the branching portion of the network creates a superposition of the back-scattered signal, which cannot be readily analyzed to locate faults or to determine the transmission loss in each branch.

In the prior art, however, a "bypass" technique has been recently proposed for monitoring transmission loss. See, for example, U.S. Pat. No. Re 36,471 (hereinafter the "Re '471 patent"), which is incorporated herein by reference. In the disclosed method of the Re '471 patent, the optical communication network includes at least one feeder fiber for transmission between a central office, and a distribution node that is coupled to a plurality of distribution fibers, each fiber in turn coupled to an ONU. Bypass fibers, however, reroute a portion of the inbound transmission from the distribution fibers to an ODTR monitor without directly passing the transmission back through the distribution node. Transmission losses and faults are determined on the basis of delays and/or monitor wavelengths of launched optical test signals coupled into the distribution node. This method unfortunately may become costly because of the need for wavelength division multiplexing and/or active switching elements.

SUMMARY OF THE INVENTION

The present invention employs "polarization markers" deployed immediately after the branching portion of a passive optical network (PON) for measuring and monitoring transmission losses and faults. Each polarization marker is configured to produce a unique polarization dependent loss (PDL) within the corresponding branch of the PON. Since each polarization marker uniquely attenuates optical test pulse(s) launched into the PON, the back-scattering uniquely varies with the launched state of polarization. Losses within each branch of the PON are then monitored by measuring the back-scattered portion of the launched optical pulse(s) as a function of time for different known states of polarization, wherein the unique PDL associated with each polarization marker is used as the basis for distinguishing the branches from one another.

In a preferred embodiment, the PON test and measurement system comprises a narrowband tunable optical source which launches short duration optical pulse(s) into the PON adjusted to have different known polarization states. As the optical pulses propagate within the PON, they encounter reflecting and scattering sites, producing an inbound optical signal which contains a superposition of the Rayleigh back-scattering from each branch of PON. To deduce the transmission loss in each branch, the polarization markers are deployed immediately after branching portion of the PON so as to introduce a unique PDL in the corresponding branch. As the launched state of polarization is varied, the constituent components of the backscatter likewise varies from which the transmission loss and faults in each branch can readily be determined.

Preferably each polarization marker consists of a retarder, linear polarizer and polarization scrambler, configured to produce a unique polarization dependent loss in each branch by introducing a relative phase difference between the two constituent orthogonal polarization components of the optical pulse(s) in each branch.

BRIEF DESCRIPTION OF THE DRAWINGS

The features and advantages of the present invention will become more readily apparent from the following detailed description of the invention in which like elements are labeled similarly and in which.

DETAILED DESCRIPTION

The present invention is based on the inventive use of "polarization markers" deployed immediately after the branching portion of the network and before the distribution fibers of the passive optical network (PON) for measuring and monitoring transmission losses and faults. Each polarization marker, consisting of a retarder, linear polarizer and polarization scrambler, is configured to produce a unique polarization dependent loss (PDL) within the corresponding branch of the PON. As such, the intensity of the optical test pulse(s) transmitted through the polarization marker is dependent on the state of polarization of the launched optical pulses and, more importantly, is unique to each branch. Since each polarization marker uniquely attenuates the optical test pulse(s), the back-scattering uniquely varies with the launched state of polarization. As such, losses within each branch of the PON may be monitored by measuring the back-scattered portion of the launched optical pulse(s) as a function of time for different known states of polarization, wherein the unique PDL associated with each polarization marker is used as the basis for distinguishing the branches from one another.

Without any loss of generality or applicability for the principles of the invention, the inventive PON test and measurement system is conveniently described with reference to an exemplary optical communication system. It should be clearly understood, however, that such an embodiment is purely illustrative, and not intended to limit the scope of the invention.

Figure 1:
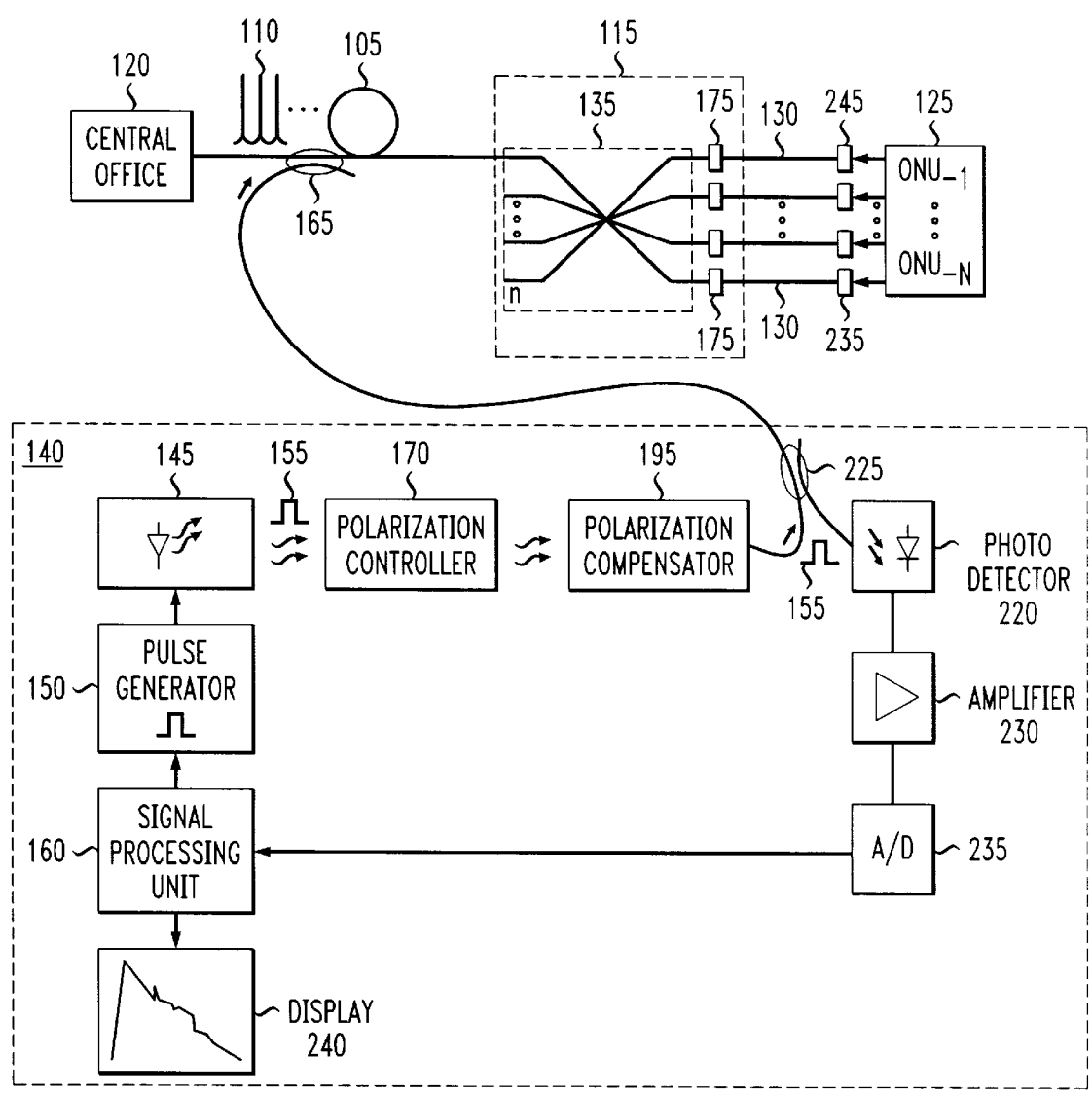
FIG. 1 is a block diagram of an optical system for measuring the transmission loss and locating faults in a passive optical network (PON) in accordance with the principles of the invention.

Shown in FIG. 1 is an exemplary wavelength division multiplexed (WDM) communication system 100 in which an optical fiber 105, which will be referred herein as a "feeder fiber," carries the desired optical signals over a plurality of independent optical channels 110 through a distribution node 115 for transmission, for example, between a central office 120 and a plurality of optical network units (ONUs) 125, ONU-1, ONU-2, . . . ONU-N. Each of the optical channels may be allocated a unique wavelength band to transmit information over feeder fiber 105 using well-known modulation techniques, preferably in the commonly used 1.55 µm region, where the attenuation is the lowest. In practice, the optical channels are generated by a plurality of transmission lasers and, then multiplexed onto feeder fiber 105 using a fiber coupler. Although not shown, WDM communication system 100 preferably also employs Erbium (Er) doped fiber amplifiers to maintain the amplitude and integrity of the optical signals over substantially the entire span of feeder fiber 105.

Optical signals which are transmitted from central office 120 towards ONUs 125 are referred to herein as "outbound optical signals," whereas signals transmitted in the opposite direction are referred to herein as "inbound optical signals." At distribution node 115, the outbound optical signals are coupled into each of N distribution fibers 130 by a star coupler 135, thereby transmitting the outbound optical signals to each of the ONUs 125. Star coupler 135 is typically a N×N coupler, where N is generally at least 8, and is more typically 16. Each ONU 125 is capable of sending and receiving optical signals to and from central office 120. Because the transmission from ONUs 125, however, is carried back on a single optical fiber to central office 120, the inbound optical signals from the ONUs are either time-division or wavelength multiplexed. Alternatively, a pair of undirectional fibers may be used, one such undirectional fiber for inbound optical signals, and another for outbound optical signals. Of course, multiple feeder fibers 105 may emanate from central office 120 to support a multiplicity of PONs.

The term "branch" will hereinafter be used to describe each distribution fiber, the corresponding ONU and any intermediate network components which lie between them. Also, the term "PON" will herein be used to describe the feeder fiber, the corresponding ONUs, and the intermediate network components which lie between them.

In accordance with the principles of the invention, shown in FIG. 1 is a PON test and measurement system 140 comprising a narrowband tunable optical source 145 which is intensity modulated by a pulse generator 150 to produce optical pulse(s) 155 upon being triggered by a signal-processing unit 160, operating in the much the same way as an optical time-domain reflectometer (OTDR). These optical pulses are launched into feeder fiber 105, but first adjusted to have different known polarization states. Although various codes and correlation techniques may be used as in conventional OTDRs, square optical pulses are sufficient, and preferably with pulse widths between 5 ns and 10 µs, depending on the desired spatial resolution and sensitivity.

Preferably, optical source 145 is an external cavity diode laser which can be tuned over a narrow spectrum to a desired test wavelength, $\lambda_{odtr}$. For 1550 nm traffic signal wavelengths, the out-of-band 1625–1650 nm spectrum may be used as the test wavelength due to the absence of traffic signal wavelengths, among other reasons, advantageously allowing the test and measurement to be performed with live traffic.

A WDM coupler 165 is preferably used for coupling optical pulse(s) 155 into feeder fiber 105, which also allows the traffic signal wavelengths to simultaneously propagate through the PON. Alternatively, an input port of N×N coupler 135 may be used to couple optical pulse(s) 155 into feeder fiber 105. In either case, a polarizer controller 170 adjusts the polarization state of optical pulses 135 so as to have different known linear states of polarization. Polarization controller 170 may be implemented in the form of a rotating waveplate, liquid crystal, or fiber coils which coil when rotated produces an asymmetric stress changing the polarization state of the incident optical light.

As optical pulses 155 propagate within the PON, they encounter reflecting and scattering sites, producing an inbound optical signal which contains a superposition of the Rayleigh backscattering from each branch of PON that originates from a length of the corresponding distribution fiber equal to about the width of the launched optical pulse. To deduce the transmission loss in each branch, polarization markers 175 are deployed immediately after coupler 135 and before distribution fibers 130, each which introduces a unique polarization dependent loss (PDL) in the corresponding branch. As the launched state of polarization is varied, the constituent components of the backscatter likewise varies from which the transmission loss and faults in each branch can readily be determined, as discussed more fully herein below.

Figure 2:
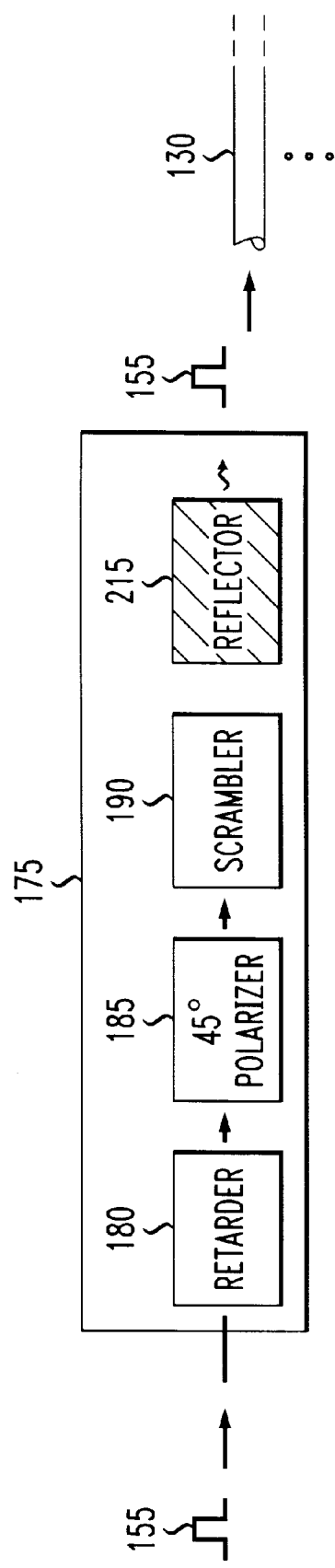
FIG. 2 is a block diagram of the polarization markers of FIG. 1 each used to introduce a unique polarization dependent loss (PDL) within the corresponding branch of the PON.

Referring to FIG. 2, each polarization marker 175 preferably consists of a retarder 180, 45° linear polarizer 185 and polarization scrambler 190, configured to produce a unique polarization dependent loss (PDL) within a corresponding branch of the PON. Alternatively, a linear polarizer having another orientation may be used. Importantly, retarder 180 serves to change the polarization state of incident optical pulse(s) 155 by introducing a relative phase difference or retardance angle of $\psi$ between the two constituent orthogonal polarization components of the optical pulse(s). In the art, retarders which introduce relative phase differences of 90°, 180°, and 360° are known as quarter-wave plates, half-wave plates, and full-wave plates, respectively.

Although retarders are typically implemented in the form of discrete optical waveplates, it is preferable that they be made from fiber coils. Such fiber based retarders typically do not exhibit attenuation, and as such do no affect the optical path of the communication traffic in the passive optical network.

By varying the retardance angle $\psi$, it is possible to induce a unique PDL within each branch of the PON. Consider the case where the incident light is linearly polarized at 45°. For a quarter-wave plate, the transmitted light would be circularly polarized, with only 50% of the light being then transmitted through linear polarizer 185. If, however, retarder 180 is a half-wave plate, then the transmitted light is initially rotated 45°, but completely attenuated by linear polarizer 185. And, yet, for a full-wave plate, the incident light experiences no attenuation at all. In general, it can be shown that the attenuation for each polarization marker 175 is dependent on the state of polarization of the incident light, and unique, if no two branches use the same retardance angle, $\psi$.

It should be recalled that losses within each branch of the PON are monitored by measuring the back-scattered portion of launched optical pulse(s) 155 as a function of time for different known states of polarization. As such, it is important to produce known states of polarization at the input of each polarization marker 175. Although the polarization state of launched optical pulses 155 is known, it is then distorted by feeder fiber 105. A polarization compensator 195 disposed before feeder fiber 105 may be configured to produce a correcting transformation on optical pulses 155 to exactly cancel the polarization transformation of feeder fiber 105.

Figure 3:
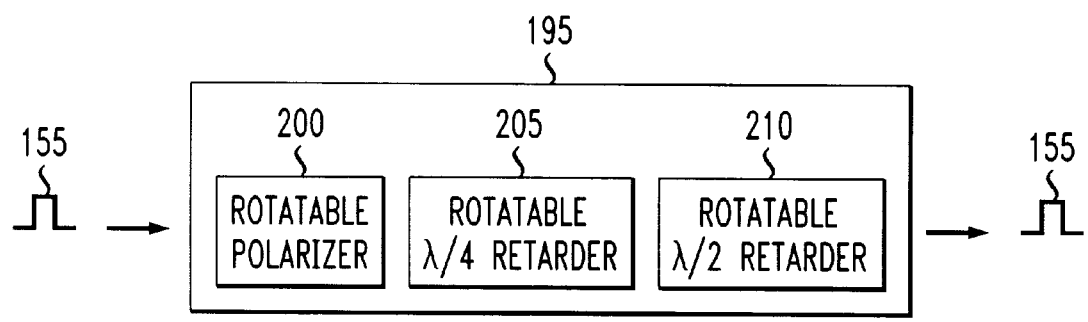
FIG. 3 is a block diagram of the polarization compensator of FIG. 1 used to cancel the polarization transformation of the feeder fiber.

Referring to FIG. 3, polarization compensator 195 includes rotatable quarter waveplates 200, 205 and half waveplate 210, allowing the generation of any polarization transformation, as is known in the art. Compensation is accomplished by employing one of the polarization markers 175 as a so-called "calibration marker" wherein a reflector 215 is disposed immediately after linear polarizer 185 along with employing a retardance angle, $\psi=0$. Alternatively, the end facet of optical fiber 130 may be used to reflect a portion of the incident light, obviating the need for reflector 215. Optical pulses 155 having a state of polarization aligned with linear polarizer 185 of the calibration branch are launched through polarization compensator 175 into the PON. Polarization compensator 195 is then adjusted by repeatably and successively rotating each element of the compensator to maximize the intensity of the reflected optical pulses from reflector 215, typically taking 2–3 iterations. Once the returned signal has been maximized, the polarization state of the optical pulses has been changed to one which after propagating through feeder fiber 105 has reverted back to its original state, i.e., aligned with linear polarizer 185. In other words, a correcting transformation has been introduced to exactly cancel the polarization transformation of feeder fiber 105, with the launched state of polarization now appearing on the polarization marker. Polarization compensator 195 may be made from short lengths of highly birefringent fiber or from coils of single-mode fiber arranged so that they rotate about a common tangent along which the feeder fiber is routed. Lefevre, H. C., "Singlemode Fibre Fractional Wave Devices and Polarization Controllers," *Electronics Letters*, September 16(20), pp. 778–80.

Normally, the inbound backscatter arriving at polarization markers 175 will similarly experience a polarization dependent loss, but unfortunately will also be time varying since its state of polarization changes with distance along distribution fiber 130. To eliminate the resulting "polarization noise" due to the time varying PDL, the backscatter is depolarized using polarization scrambler 190. In this manner, the inbound attenuation experienced by the backscatter is no longer polarization dependent since unpolarized light does not experience the effects of polarization dependent loss or gain. A polarization maintaining fiber aligned with linear polarizer 185 can be used as a scrambler to differentially rotate several times the polarization states of the constituent components of the backscatter, thereby producing unpolarized light.

It should be clearly understood that the optical components of the polarizer markers, although operating at the out-of-band test wavelength, are also transparent to the traffic signal wavelengths. Furthermore, the polarization components of the markers (i.e., the linear polarizers) may be implemented in the form of so-called long period fiber gratings and fabricated directly into the distribution fibers. Such fiber gratings when fabricated in a birefringent manner are highly polarization selective, only strongly attenuating the light polarized along the orthogonal axis for the out-of-band test wavelength. Such fiber gratings are discussed in, for example, Ostling et al., "Polarization-Selective Mode Coupling In Two-Mode Hi-Bi Fibers," *Journal of Lightwave Technology*, Vol. 15(2), February 1997, pp. 312–20; and Kurkov et al., "Long-Period Fiber Grating As A Wavelength Selective Polarization Element," *Electronics Letters*, Vol. 33(7), Mar. 27, 1997, pp. 616–17, each of which is incorporated herein by reference.

Preferably, the above fiber based optical components are fabricated using, in part, the so-called "OptiFlex" fiber technology to facilitate fabrication and packaging. This OptiFlex technology is disclosed in U.S. Pat. Nos. 5,155,785; 5,259,051; and 5,421,930 which are incorporated herein by reference. Using this technology, a robotic routing machine is employed to apply optical fibers in a routing pattern, such as nested loops, onto a flat surface, such as a flexible plastic or film. The fibers are bonded to the surface using a pressure-sensitive adhesive, and in the case of fiber gratings, then may be exposed to UV radiation so as to write the periodical refractive variation to form the Bragg gratings. After routing, the fibers may be covered by a conformal coating, such as silicone or urethane, that encapsulates them to protect them against damage.

Now referring back to FIG. 1, the inbound backscattering is coupled to a photo-detector 220, such as a p-i-n diode or avalanche photo-diode (APD), through a directional coupler 225 wherein the back-scattering is then converted to an electrical signal. Although directional coupler 225 is preferably a 3 dB fusion type fiber coupler, beam splitters, circulators, prisms or optical switches may also be used to perform the same function. The electrical signal is amplified by an amplifier 230, converted into a digital signal using an analog-to-digital converter (ADC) 235, and then processed by signal processor 160 to compute the attenuation or transmission loss in each branch on the basis of the back-scatter measured as a function of time for different known launched states of polarization. Because the back-scatter signal is typically weak, the measurement may be averaged over several minutes to detect the back-scattering from the receiver noise. If desired, the intensity of the backscattering may be displayed on a monitor 240.

To prevent optical pulse(s) 155 from saturating photodetector 220, sufficient isolation of course should be provided between laser diode 145 and photo-detector 220. Also to ensure nonintrusive testing, optical pulses 155 are removed from the traffic signals prior to reaching ONUs 125 by inserting a bandpass filter 245 to block, for example, the 1650 nm wavelength of optical pulse(s) 155.

It should be understood that the branch transmission loss or attenuation cannot be determined directly from a single backscatter measurement, but must rather be derived from several such measurements, each for a different known state of polarization, as follows. Each state of polarization of the launched optical pulse(s) 155 can be expressed as a so-called Stokes vector $\lfloor s_i \rfloor$ which is a 4×1 matrix having elements known as Stokes parameters that describe the optical power of the launched pulses in particular reference polarization states as follows:

$$[S_i] = \begin{vmatrix} S_{0i} \\ S_{1i} \\ S_{2i} \\ S_{3i} \end{vmatrix} \qquad (1)$$

where i corresponds to the $i^{th}$ input polarization state; $S_{0i}$ is the total power; $S_{1i}$ is the optical power through a linear horizontal polarizer minus the optical power through a linear vertical polarizer; $S_{2i}$ is the optical power through a +45° linear polarizer minus the optical power through a −45° linear polarizer; and $S_{3i}$ is the optical power through a right circular polarizer minus the optical power through a left circular polarizer, each for the corresponding $i^{th}$ input polarization state.

The Stokes vectors may be normalized by dividing each element by the corresponding value $$S_{0i} : s_{0i} = \frac{S_{0i}}{S_{0i}}; \; s_{1i} = \frac{S_{1i}}{S_{0i}}; \; s_{2i} = \frac{S_{2i}}{S_{0i}}; \; \text{and } s_{3i} = \frac{S_{3i}}{S_{0i}}.$$

In general, the transmission and polarization characteristics of an optical fiber can be represented by a 4×4 Muller matrix. As such, optical pulse(s) 155 described by the Stokes vectors $\lfloor s_i \rfloor$ will be transformed into output optical pulses of polarization $\lfloor s_i' \rfloor$ by feeder fiber 105 as follows:

$$\lfloor s_i' \rfloor = [M] \lfloor s_i \rfloor \qquad (2)$$

where $\lfloor s_i \rfloor$ and $\lfloor s_i' \rfloor$ are the input and output normalized Stokes vectors, respectively, for the $i^{th}$ polarization state, and $\lfloor M \rfloor$ is the Mueller matrix of feeder fiber 105. For a generalized treatment of polarization and Mueller matrixes, see, for example, *Polarized Light: Fundamentals and Applications,* Edited by Edward Collett, Marcel Dekker, Inc., New York, 1993.

It is, however, useful to treat the optical characteristics of optical fiber 105 independently and, more particularly, as a combination of its attenuation and polarization properties. In doing so, the 4×4 Muller matrix $\lfloor M \rfloor$ can be readily rewritten as a product of two matrices, one matrix $\lfloor M_a \rfloor$, referred to as an "attenuation matrix," purely describing the attenuation, and another matrix $\lfloor M_p \rfloor$, referred to as a "polarization matrix," describing the polarization properties, i.e., the rotation of the input Stokes vectors within or on the Poincare sphere as optical pulse(s) 155 travels along optical fiber 105:

$$[M] = [M_a][M_p] \qquad (3)$$

where $$[M_a] = \begin{vmatrix} T_f & 0 & 0 & 0 \\ 0 & T_f & 0 & 0 \\ 0 & 0 & T_f & 0 \\ 0 & 0 & 0 & T_f \end{vmatrix} \qquad (4)$$

$$[M_p] = \begin{vmatrix} 1 & 0 & 0 & 0 \\ 0 & m_{22} & m_{23} & m_{24} \\ 0 & m_{32} & m_{33} & m_{34} \\ 0 & m_{42} & m_{43} & m_{44} \end{vmatrix} \qquad (5)$$

and $T_f$ is the transmission factor of optical fiber 105, which ranges from 0 to 1. The power transmission relation between incident light $P_O$ and the transmitted power $P_T$ is $P_T = T_f \times P_O$.

In general, N×N coupler 135 will not change the state of polarization of optical pulse(s) 155, and, hence, its Mueller matrix [C] can simply be replaced by its attenuation matrix $[C_a]$, which has the same form as that of the fiber attenuation matrix $[M_a]$ but with a transmission factor $T_c$ appropriate for the coupler substituted. Since light entering each input port of the coupler is nominally split equally among N output ports, the transmission factor $T_c \approx 1/N$. For example, a 8×8 coupler has a nominal transmission factor of 1/8=0.125 or −9 dB.

The Stoke vectors $[s_i'']$ for the incident light on any polarization marker 175 can now be derived as simply the polarization transformation induced by feeder fiber 105 multiplied by the attenuation matrix $[C_a]$ of N×N coupler 135:

$$[s_i''] = [C_a][M_a][M_p][s_i40] \qquad (6)$$

where $$[C_a] = \begin{vmatrix} T_c & 0 & 0 & 0 \\ 0 & T_c & 0 & 0 \\ 0 & 0 & T_c & 0 \\ 0 & 0 & 0 & T_c \end{vmatrix} \qquad (7)$$

It is, however, desired to produce known states of polarization at the input of each polarization marker 175. As previously discussed, to do so, polarization compensator 195 is disposed immediately before feeder fiber 105 and configured to produce a transformation $[M_p]^{-1}$ on optical pulses 155 that exactly cancels the transformation of feeder fiber 105. Obviously, this requires multiplying the known states of polarization $[s_i]$ by the inverse polarization matrix $[M_p]^{-1}$ of feeder fiber 105, but is done so without determining its matrix elements.

$$[s_i''] = [C_a][M_a][M_p][M_p]^{-1}[s_i] \qquad (8)$$

yielding the result, $$[s_i''] = [C_a][M_a][s_i] \qquad (9)$$

wherein $[C_a]$, $[M_a]$, and $[s_i]$ are known.

From above Eq. (9), it should be obvious that for any branch of the PON, the transmission loss experienced by optical pulse(s) 155 at a point immediately before the corresponding polarization marker is simply due to the attenuation arising from both N×N coupler 135 and feeder fiber 105.

Similarly, we can derive the polarization state for optical pulses 155 after propagating through polarization marker 175:

$$[s_i''']_m = [PM]_m[s_i''] \qquad (10)$$

where $[PM]_m$ is the Muller matrix for the $m^{th}$ polarizer marker, and $[s_i''']_m$ is the Stokes vector for the $i^{th}$ launched polarization state, within the $m^{th}$ polarizer marker.

Recall that each polarization marker 175 consists of retarder 180 45° linear polarizer 185 and polarization scrambler 190, and is configured to produce a unique polarization dependent loss (PDL) within a corresponding branch by varying the retardance angle ψ thereof. To derive an exact expression for the polarization dependent loss of each marker, we assume that polarization scrambler 190 produces no added attenuation as it randomizes the state of polarization of the light traveling further downstream into the branch. The normalized Stokes vectors $[s_i''']_m$ for optical pulse(s) 155 passing through any polarization marker, thus can be rewritten as:

$$[s_i''']_m=[PM]_m[s_i''] \quad (11)$$

$$[s_i''']_m=[M_{1p}][M_r]_m[s_i''] \quad (12)$$

where $\lfloor M_r \rfloor_m$ is the Mueller matrix for the retarder within the $m^{th}$ polarization marker, and $\lfloor M_{1p} \rfloor$ is the Mueller matrix for the linear polarizer.

The Muller matrix $\lfloor M_r \rfloor$, however, of a retarder which introduces a relative phase difference $\psi$ between the two constituent orthogonal polarization components is given by:

$$[M_r] = \frac{1}{2}\begin{vmatrix} 1 & 0 & 0 & 0 \\ 0 & 1 & 0 & 0 \\ 0 & 0 & \cos\varphi & -\sin\varphi \\ 0 & 0 & \sin\varphi & \cos\varphi \end{vmatrix} \quad (13)$$

whereas the Muller matrix of the 45° linear polarizer is given by:

$$[M_{1p}] = \begin{vmatrix} 1 & 0 & 1 & 0 \\ 0 & 0 & 0 & 0 \\ 1 & 0 & 1 & 0 \\ 0 & 0 & 0 & 0 \end{vmatrix} \quad (14)$$

Now, inasmuch as only the polarization dependent loss introduced by polarization markers 175 is of interest, we can neglect the Mueller matrix for polarization scrambler 190, as well assume negligible attenuation.

Inserting Eqs. (13) (14) into Eq. (12), and performing the above matrix multiplication of Eq. (12), the polarization dependent loss $PDL_{i_m}$ is given by the first element of the resulting matrix, $$PDL_{i_m} = s_{0i}''' = \frac{1}{2}(s_{0i}'' + s_{2i}'' \cos\psi_m - s_{3i}'' \sin\psi_m) \quad (15)$$

where $PDL_{i_m}$ is the polarization dependent loss of the $m^{th}$ polarization marker, and for the $i^{th}$ launched polarization state.

Note that the PDL varies sinusoidally as a function of the retardance angle $\psi$. Hence, it is apparent that to produce a unique polarization dependent loss, each polarization marker 175 must employ a unique retardance angle between 0 and $2\pi$. Note, however, that the PDL has been normalized to unity since normalized Stokes parameters have been used. Moreover, note that the transmission loss has a maximum amplitude variation when the incident state of polarization is linear, i.e., $s_3=0$. Preferably, the values of the retardance angle $\psi$ are spaced equally apart from one another, and given by:

$$\varphi_m = (m-1)2\frac{\pi}{N} \quad (16)$$

where N is the number of branches in the PON.

An attenuation matrix $[M_{i_{pm}}]_m$ for each polarization marker 175 can then be formed from the polarization dependent loss, $$([M_{i_{pm}}])_m = \begin{vmatrix} PDL_{i_m} & 0 & 0 & 0 \\ 0 & PDL_{i_m} & 0 & 0 \\ 0 & 0 & PDL_{i_m} & 0 \\ 0 & 0 & 0 & PDL_{i_m} \end{vmatrix} \quad (17)$$

and an expression written for the polarization state at an arbitrary scattering location a distance W along any distribution fiber 130:

$$[s_i'''']_m=[M_B]_m[M_{i_{pm}}]_m[s_i'']_m \quad (18)$$

where $[M_B]_m$ is the Mueller matrix for the $m^{th}$ distribution fiber along a portion thereof of length W (i.e., distance W away). Inasmuch as PON test and measurement system 140 measures, as a function of time, the intensity of the backscatter, we can now derive the backer-scatter intensity response caused by the launched optical pulses. Since the optical pulses have been depolarized, we can also assume a negligible amount of PDL within distribution fibers 130, allowing the Muller matrix $[M_B]_m$ to be substituted with its attenuation matrix $[M_{BA}]_m$, $$([M_{BA}])_m = \begin{vmatrix} T_{ba_m} & 0 & 0 & 0 \\ 0 & T_{ba_m} & 0 & 0 \\ 0 & 0 & T_{ba_m} & 0 \\ 0 & 0 & 0 & T_{ba_m} \end{vmatrix} \quad (19)$$

where $T_{ba_m}$ is the transmission factor of the $m^{th}$ distribution fiber at an arbitrary point along a distance W from the corresponding polarization marker.

The back-scattered light likewise experiences the same attenuation on its travel back, except that now the attenuation through the marker is no longer polarization dependent due again to the depolarization that occurred in the direction of the inbound optical signals. As such, each polarization marker instead produces a uniform 3 dB or 50% transmission. Inserting Eqs. (9), (15),(17) and (19) into Eq. (18), and performing the matrix multiplication, the normalized backscatter $BS_{i_m}$ from an arbitrary point along any branch can be obtained from the first element of the resulting matrix as a function of the launched polarization state, $$BS_{i_m} = \frac{T_f^2 T_c}{4}(s_{0i} + s_{2i}\cos\varphi_m - s_{3i}\sin\varphi_m)T_{b_m} \quad (20)$$

where $BS_{i_m}$ is the normalized backscatter of the $m^{th}$ distribution fiber at an arbitrary point along a distance W from the corresponding polarization marker.

Summing up the backscatter from each branch to account for its contribution, the total normalized backscatter $P(W)_i$ from an arbitrary location along the distribution fiber, yields, $$P(t)_i = \sum_{m=1}^{N} BS_{i_m} = \frac{T_f^2 T_c}{4}\left(\sum_{m=1}^{N}(s_{0i} + s_{2i}\cos\varphi_m - s_{3i}\sin\varphi_m)\right)T_{b_m} \quad (21)$$

Inasmuch as the normalized backscatter is a function of the distance W and as such time, the normalized backscatter has been denoted herein as $P(t)_i$ for emphasis.

In general, it can be shown that for n unknown variables, the solution requires a set of n linear equations. Hence, it is apparent that to solve for the branch attenuation $T_{b_m}$, requires N equations, each involving a unique state of polarization launched into feeder fiber 105, i.e., i=1 . . . N. The N equations may be condensed and expressed in matrix form where the $P(t)_i$ and A terms are known, and the $T_{b_m}$ variables are to be determined:

$$\frac{T_c T_f}{4}[A][T_{b_m}] = [P_i] \quad (22)$$

where $$[A] = \begin{vmatrix} a_{11} & a_{21} & a_{31} & \cdots & \cdots & a_{1N} \\ a_{12} & a_{22} & \cdots & \cdots & a_{23} & a_{2N} \\ \vdots & & & & & \\ a_{i1} & a_{i2} & a_{i3} & \cdots & \cdots & a_{iN} \end{vmatrix}$$

with $$a_{im} = s_{0i} + s_{2i} \cos \psi_m - s_{3i} \sin \psi_m$$

and $$[T_{b_x}] = \begin{vmatrix} T_{b_1} \\ T_{b_2} \\ T_{b_3} \\ \vdots \\ T_{b_N} \end{vmatrix}$$

Pre-multiplying both sides of Eq. (22) by $[A]^{-1}$ results in $$[T_{B_m}(t)] = \frac{4}{T_c T_f}[A]^{-1}[P_i(t)] \quad (23)$$

which provides the general solution for the attenuation of each branch. Of course, the above general solution requires that the inverse matrix $[A]^{-1}$ be nonsingular, hence requiring, among other things, N unique polarization states to be launched into feeder fiber 105, i.e., N non-complementary linear polarization states. Preferably, the N linear polarization states are as far as possible apart from one another on the Poincare sphere to $$[P(t)_i] = \begin{vmatrix} P(t)_1 \\ P(t)_2 \\ P(t)_3 \\ \vdots \\ P(t)_N \end{vmatrix}$$

minimize the effects of noise, preferably linearly polarized at an angle $\theta_i$, $$\theta_i = (i-1)2\frac{\pi}{N} \quad (24)$$

Figure 4:
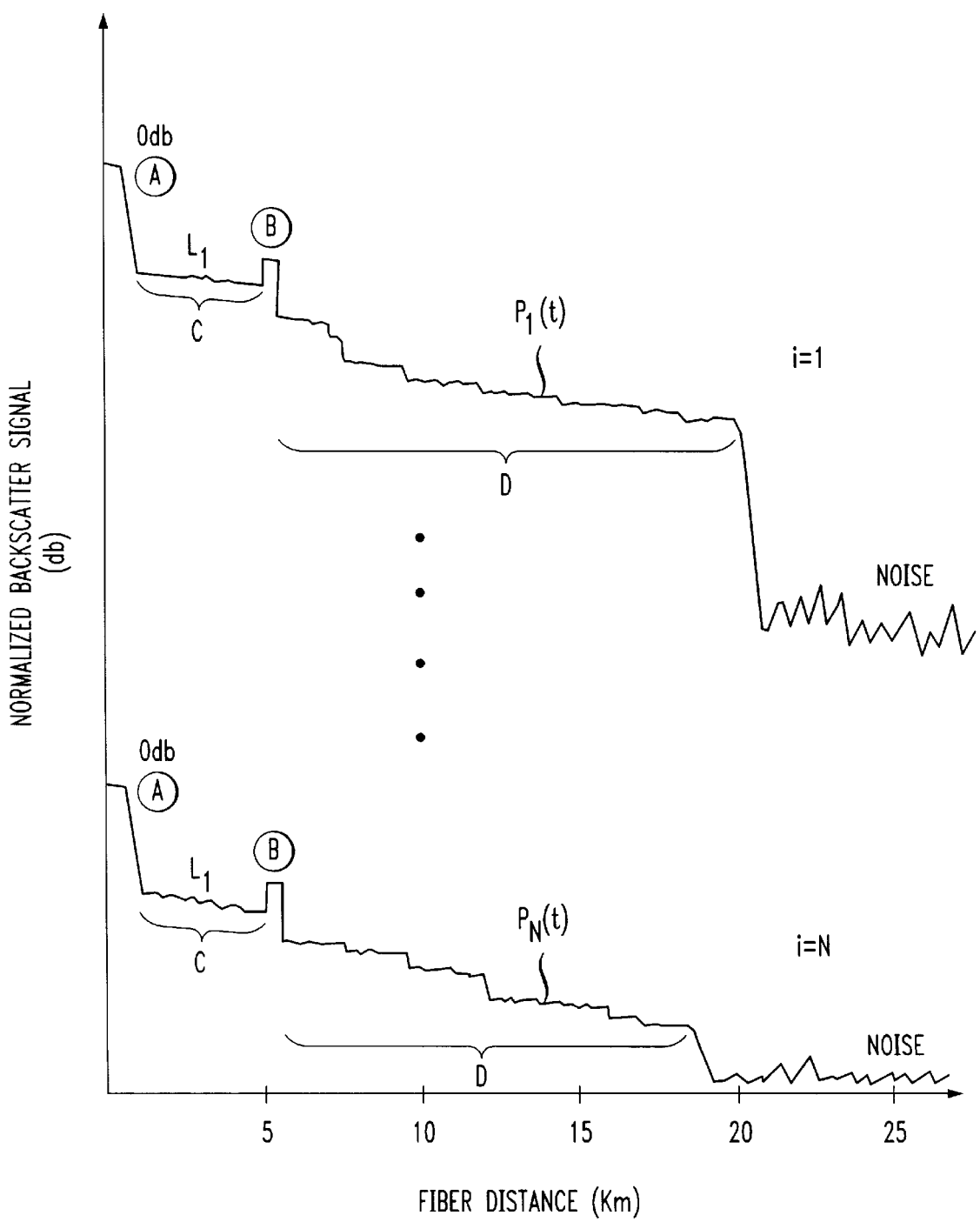
FIG. 4 depicts exemplary traces of the normalized backcatter as a function of distance useful in illustrating the principles of the present invention.

Shown in FIG. 4 are exemplary traces of the measured normalized backscatter signal for N launched states of polarization. The vertical axis represents the relative signal level of the backscatter on a logarithmic scale (dB). The horizontal axis, however, corresponds to the distance between the instrument and a location along the branch of the PON, with the time base translated to fiber distance using a conversion factor of about 10 $\mu s$ per second. Inasmuch as the light travels forward and backward to the instrument, thereby experiencing twice the fiber attenuation, both axes are scaled by a factor of two. Although similar sets of traces are observed at each of the N launched states of polarization, only two traces have been depicted in FIG. 4, i=1 and i=N.

In general, the backscatter traces depict the backscatter signal weakening with increasing distance, along with spikes and steps caused by discrete reflections, such as from coupler 165 or the polarization markers 175. The exact feature is readily deduced from the observed time delay for the corresponding spike or step. For example, feature A is the reflection of the connector that mates the PON test and measurement system to the PON, whereas feature B corresponds to the reflected signal from the calibration marker, which also coincidences with any other reflected signals associated with connecting N×N coupler 135 to each of polarization markers 135.

With each trace plotted as power versus distance, the signature portions C and D of the traces represent the fiber's backscatter signal before and after the distribution node 115, respectively, as a function of distance. Preferably, least-square-approximation techniques may be employed to fit a line $L_1$ through the backscatter data points of signature portion C, wherein the slope of $L_1$ provides the attenuation in dB/km of feeder fiber 105. Signature portion D, however, represents the backscatter signal $P_i(t)$ from points along the branch after distribution node 115. Because this latter backscatter signal is a superposition of the Rayleigh backscattering from each branch of the PON along the corresponding distribution fiber 130, the branch attenuation cannot be determined directly from any one single backscatter measurement, but must rather be derived from several such measurements, each for a different known state of polarization, as discussed above in accordance with the principles of the present invention.

On the basis of Eq. (23), the transmission loss $T_{b_m}(t)$ for each branch of the PON can readily be determined from the normalized backscatter signals:

$$T_{b_m}(t) = F(P_i(t), \ldots P_N(t)) \quad (25)$$

where F is the transformation function of Eq. (23). In practice numeric iteration techniques may be used to evaluate the transformation function, preferably using the previous values of as the initial values in the iterations.

Figure 5:
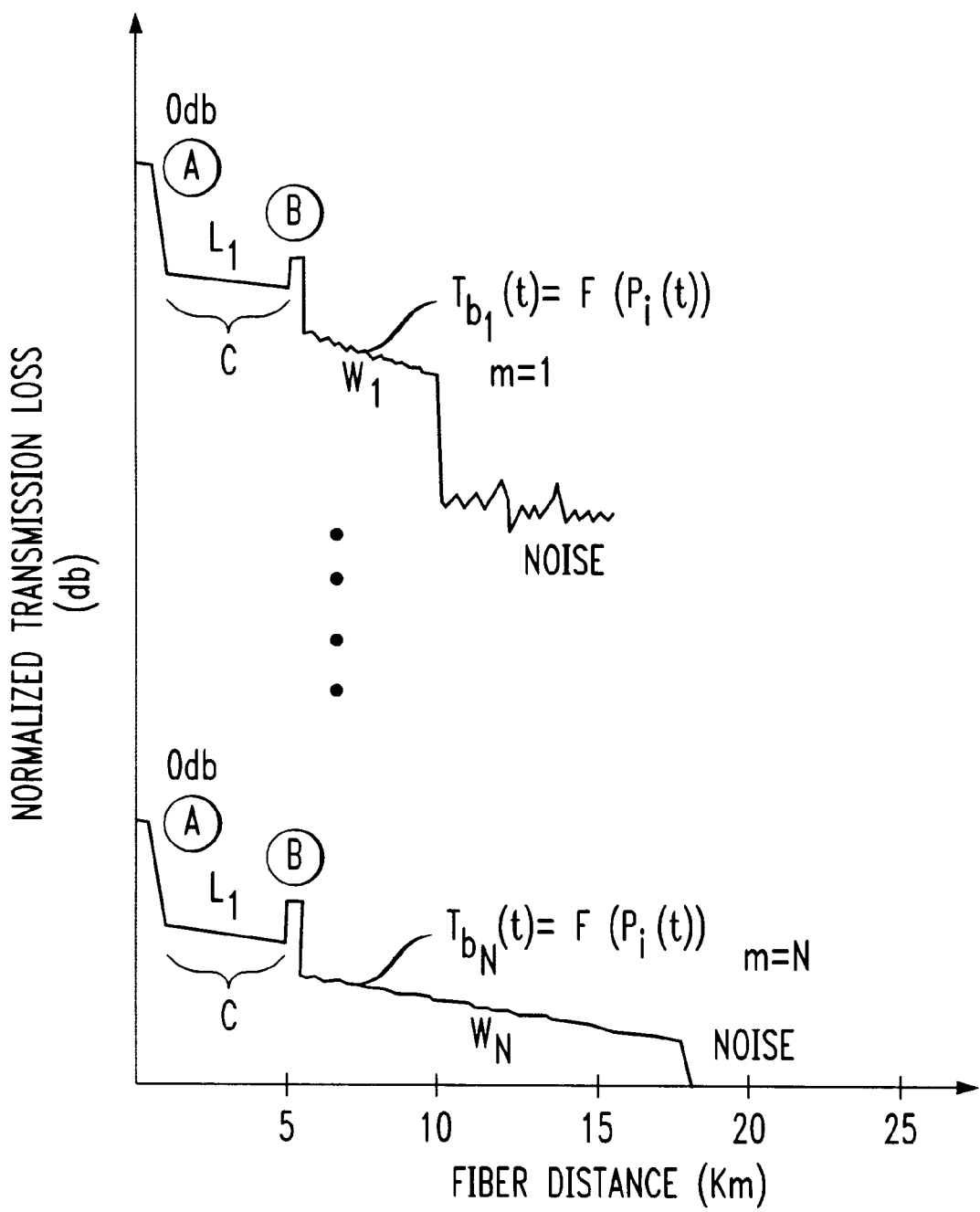
FIG. 5 depicts exemplary traces of the branch transmission loss as a function of distance derived from the backscatter traces of FIG. 4.

Shown in FIG. 5 is the transmission loss $T_{b_m}(t)$ plotted on a logarithmic scale (db) for each branch. Note that since the backscatter has been normalized, it is equivalent to and the same as the transmission loss. Again, the time base has been translated to fiber distance using a conversion factor of about 10 $\mu s$ per second. With least-square-approximation techniques used to fit straight lines $W_m$ through the transmission data points for each branch, the attenuation (dB/km) of the distribution fiber for each corresponding branch of the PON is given by the corresponding slope of $W_m$.

Note that the present PON test and measurement may be used in combination with remote sensing to ensure the integrity of the optical fibers in the PON. During network installation, a baseline loss for each branch can be created and saved in a database. Periodically, the branch attenuation, derived from backscatter measurement for different known state of polarization, can then be compared to their reference values for preventive maintenance.

Figure 6:
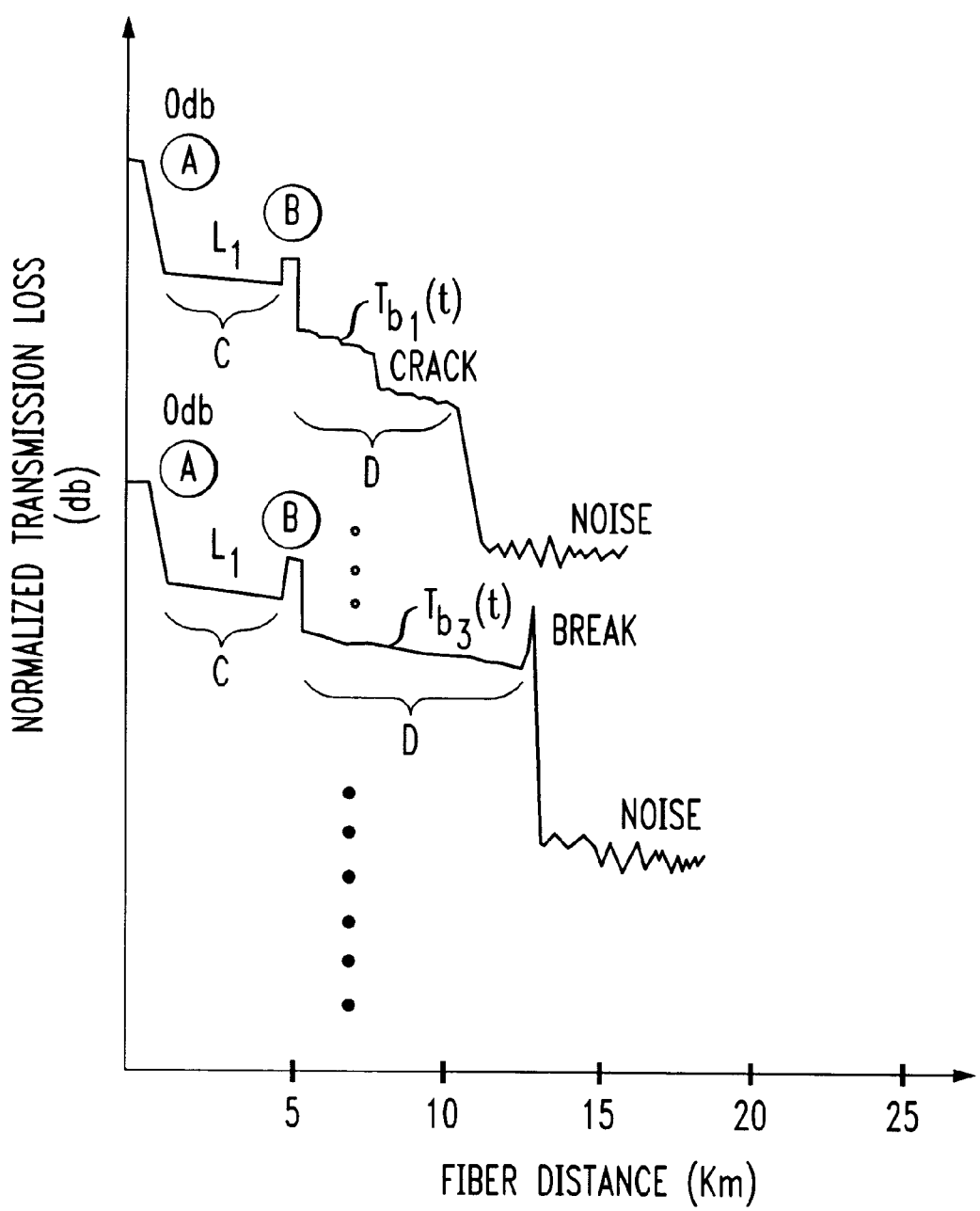
FIG. 6 depicts exemplary features associated with break and cracks in the distribution fibers for the exemplary traces of FIG. 5.

Of course, the present invention likewise may be used to locate faults, such as breaks, bends or cracks, in the distribution fibers. In doing so, such faults would appear as spikes and/or discontinuities in the derived transmission loss $T_{b_m}(t)$ for the corresponding branch of the PON. Shown in FIG. 6 is the derived transmission loss, depicting a crack in branch 1 (m=1), and a break in branch 3 (m=3) of the PON. These features appear this way since the backscatter is either severely attenuated from a point originating at the fault or because the backscatter is nonexistent. The location of the fault is readily deduced from the observed time delay for the corresponding spike or discontinuity.

It should be understood that the embodiments herein above are merely illustrative of the principles of the invention. Various modifications may be made by those skilled in the art which will embody the principles of the invention and fall within the spirit and the scope thereof. For example, although 45° linear polarizers have been employed in the polarization markers, the above mathematics can be readily generalized to include polarizers at different orientations.

What is claimed is:

1. An apparatus for measuring transmission loss in a passive optical network (PON) transmitting optical signals from an optical fiber to each of N branches, said apparatus comprising:

means for launching optical pulses into the PON, said optical pulses having different known states of polarization;

polarization markers deployed with each branch of the passive optical network for introducing a unique polarization dependent loss (PDL) in the corresponding branch of the PON;

means for measuring the backscatter of the optical pulses from the PON as a function of time, for each of the different known states of polarization; and means for deriving the transmission loss based on the backscatter of the optical pulses for each of the different known states of polarization, wherein the unique PDL associated with each branch is used as the basis for distinguishing the branches of the PON from each other.

2. The apparatus of claim 1 wherein the polarization markers are deployed immediately after a branching portion of the PON.

3. The apparatus of claim 1 wherein one of the polarization marker includes a reflector.

4. The apparatus of claim 1 wherein each of said polarization markers includes a retarder, linear polarizer and polarization scrambler.

5. The apparatus of claim 4 wherein each of said retarder has a retardance angle $\psi_m$ given by $\psi_m=(m-1)\pi/N$, where the subscript numeral m denotes the branch.

6. The apparatus of claim 4 wherein said linear polarizer is oriented at 45°.

7. The apparatus of claim 1 wherein said means for deriving includes a signal processor.

8. The apparatus of claim 1 wherein said means for launching includes an optical source for generating light at a desired wavelength, and a pulse generator for modulating the intensity of the light from the optical source to produce the optical pulses.

9. The apparatus of claim 1 wherein said means for launching includes a polarizer controller for adjusting the polarization state of the optical pulses.

10. The apparatus of claim 1 further comprising a polarization compensator for producing a correcting transformation on the optical pulses to cancel the polarization transformation of the feeder fiber.

11. The apparatus of claim 10 wherein said polarization compensator includes rotatable quarter and half-waveplates.

12. The apparatus of claim 1 wherein said optical pulses have one of N known linear states of polarization.

13. The apparatus of claim 12 wherein said N known linear states of polarization are oriented at an angle given by $$\theta_i = (i-1)\frac{2\pi}{N},$$

where the subscript numeral i denotes the polarization state.

14. The apparatus of claim 1 wherein said polarization markers include fiber coils.

15. In a passive optical network (PON) having a feeder fiber carrying traffic signals, and a star coupler coupling the traffic signals from the feeder fiber to each of N optical network units (ONUs) through a corresponding distribution fiber, with each ONU, the corresponding distribution fiber and any intermediate network components lying between them referred to as a branch, an apparatus for measuring the transmission loss in each distribution fiber, comprising:

an optical source generating optical pulses having N known polarization states;

an optical coupler coupling the optical pulses into the feeder fiber while simultaneously allowing the traffic signals to propagate along each of the N distribution fibers;

polarization markers deployed along each branch of the PON for introducing a unique polarization dependent loss (PDL) in the corresponding branch of the PON;

means for measuring the backscatter of the optical pulses from the distribution fibers as a function of time, for each of the different known states of polarization;

a signal processor for deriving the transmission loss of each distribution fiber from the backscatter of the optical pulses for each of the different known states of polarization, wherein the unique PDL associated with each branch is used as the basis for distinguishing the distribution fibers.

16. The apparatus of claim 15 wherein one of the polarization markers includes a reflector.

17. The apparatus of claim 15 wherein the star coupler is a N×N optical coupler.

18. The apparatus of claim 15 wherein the polarization markers are deployed immediately after the star coupler and before the distribution fibers.

19. The apparatus of claim 15 wherein each of said polarization markers includes a retarder, linear polarizer and polarization scrambler.

20. The apparatus of claim 19 wherein each of said retarder has a retardance angle $\psi_m$ given by $\psi_m=(m-1)\pi/N$, where the subscript numeral m denotes the branch.

21. The apparatus of claim 19 wherein said linear polarizer is oriented at 45°.

22. The apparatus of claim 15 wherein said means for deriving includes a signal processor.

23. The apparatus of claim 15 further comprising a pulse generator for modulating the intensity of the light from the optical source.

24. The apparatus of claim 15 further comprising a polarizer controller for adjusting the polarization state of the optical pulses.

25. The apparatus of claim 15 further comprising a polarization compensator for producing a correcting transformation on the optical pulses to cancel the polarization transformation of the feeder fiber.

26. The apparatus of claim 25 wherein said polarization compensator includes rotatable quarter and half-waveplates.

27. The apparatus of claim 15 wherein said optical pulses have one of N known linear states of polarization.

28. The apparatus of claim 27 wherein said N known linear states of polarization are oriented at an angle given by $$\theta_i = (i-1)\frac{2\pi}{N},$$

where the subscript numeral i denotes the polarization state.

29. The apparatus of claim 27 wherein said polarization markers include fiber coils.

30. In a passive optical network (PON) having a feeder fiber carrying traffic signals, and a distribution node distributing the traffic signals from the feeder fiber to each of N optical network units (ONUs) along a corresponding distribution fiber, with each ONU, the corresponding distribution fiber and any intermediate network components lying between them referred to as a branch, a method for measuring the transmission loss in each distribution fiber, comprising the steps of:

launching optical pulses into the feeder fiber having one of N known polarization states;

introducing a unique polarization dependent loss (PDL) in each branch of the PON;

measuring the backscatter of the optical pulses from the distribution fibers as a function of time, for each of the N known states of polarization; and deriving the transmission loss of each distribution fiber from the backscatter of the optical pulses, with the unique PDL associated with each branch used as the basis for distinguishing the distribution fibers.

31. The method of claim 30 further comprising the step of adjusting the polarization state of the optical pulses.

32. The method of claim 30 further comprising the step of producing a correcting transformation on the optical pulses to cancel the polarization transformation of the feeder fiber.

33. The method of claim 30 further comprising the step of adjusting the N known states of polarization to have an linear polarization oriented at an angle given by $\theta_i=(i-1)2\pi/N$, where the subscript numeral i denotes the polarization state.

34. The method of claim 30 further comprising the step of identifying faults in each distribution fiber by noting any discontinuities and/or spikes in the transmission loss.

* * * * *